Nov. 5, 1929.  R. D. McINTOSH  1,734,589

CUTTING AND WELDING TORCH

Filed Nov. 13, 1924  2 Sheets-Sheet 1

INVENTOR:
Robert D. McIntosh,
By John Howard McElroy
HIS ATTY.

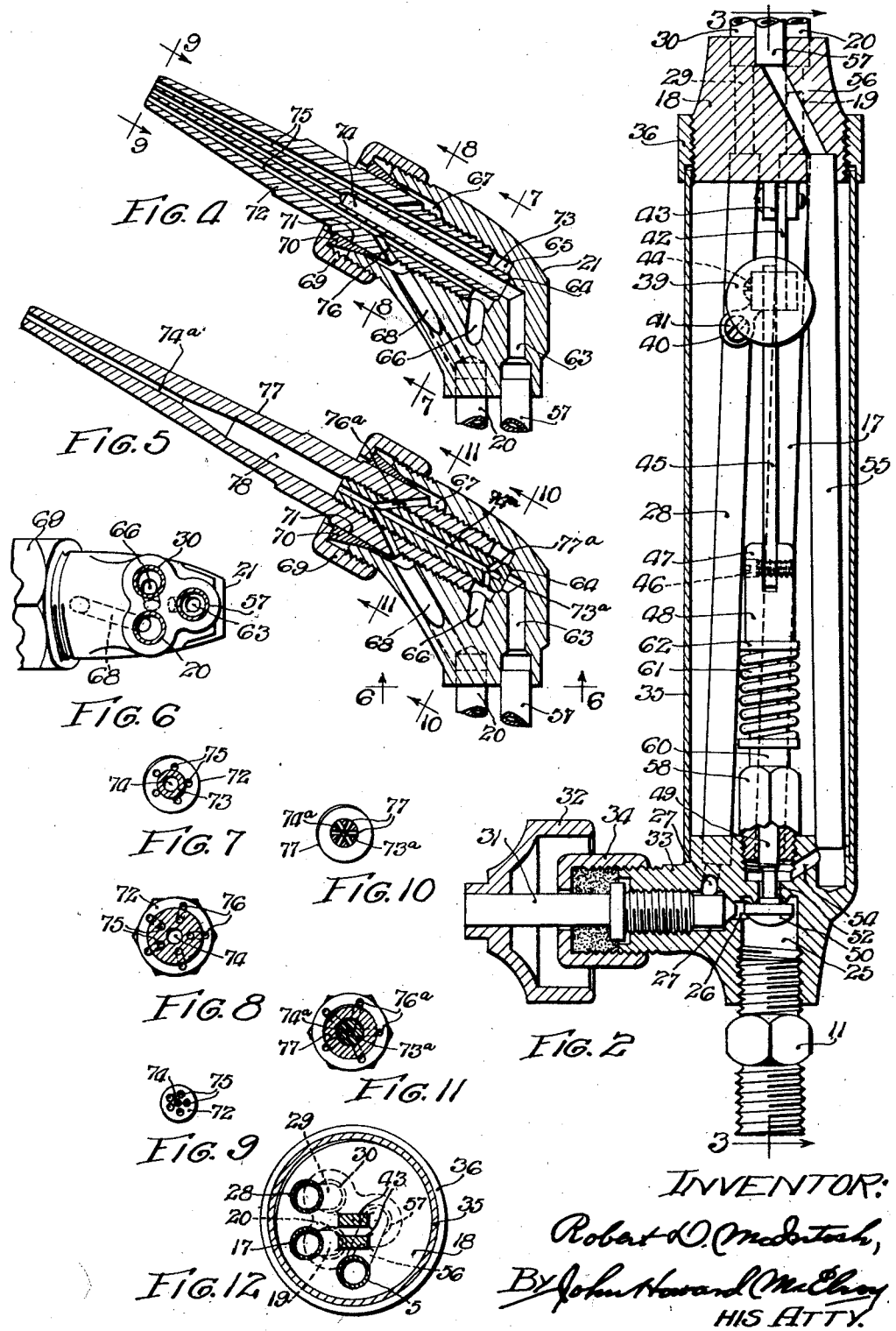

Patented Nov. 5, 1929

1,734,589

UNITED STATES PATENT OFFICE

ROBERT D. McINTOSH, OF RIVER FOREST, ILLINOIS, ASSIGNOR TO THE IMPERIAL BRASS MANUFACTURING COMPANY, OF CHICAGO, ILLINOIS, A CORPORATION OF ILLINOIS

CUTTING AND WELDING TORCH

Application filed November 13, 1924. Serial No. 749,738.

My invention is concerned with torches, such as are used for cutting and welding, and is designed among other things to produce a cutting torch that can be used as a welding torch merely by the substitution of a welding tip for a cutting tip, and without any change whatsoever in the rest of the torch.

It is further designed to produce a torch in which the parts can be readily gotten out for inspection, repairs and replacements.

It is also concerned with certain novel combinations or elements, all as will be fully described in the specification and particularly pointed out in the claims.

To illustrate my invention, I annex hereto two sheets of drawings in which the same reference characters are used to designate identical parts in all the figures, in which—

Fig. 2 is a horizontal section as seen on the line 2—2 of Fig. 1, but on an enlarged scale;

Fig. 4 is a central vertical section through the tip block showing a cutting tip in place;

Fig. 5 is a view similar to Fig. 4, but showing a welding tip in place;

Fig. 6 is a section on the line 6—6 of Fig. 5;

Figure 3:
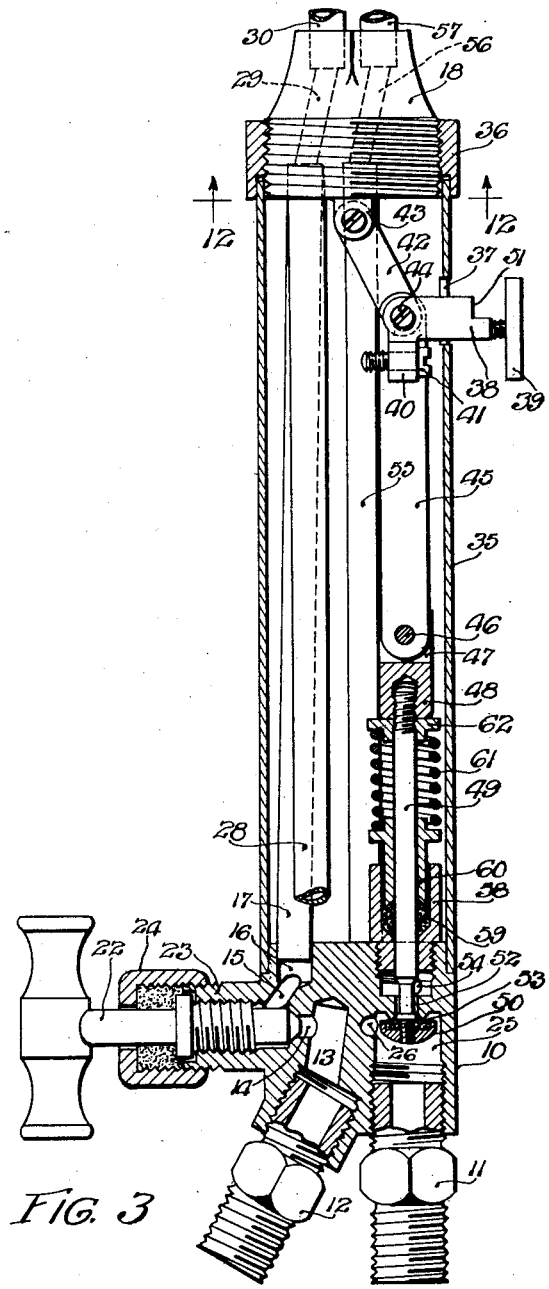
Fig. 3 is a vertical section, as seen on the line 3—3 of Fig. 2.

Figs. 7, 8 and 9 are views as seen in section on the lines 7—7, 8—8 and 9—9 of Fig. 4;

Figs. 10 and 11 are sections as seen on the lines 10—10 and 11—11 of Fig. 5;

Fig. 12 is a view in section as seen on the line 12—12 of Fig. 3.

In carrying out my invention in its preferred form, I employ a valve block 10, which is provided with the two inlet connections 11 and 12 threaded into apertures formed therein, and the connection 12 for the acetylene gas opens into a recess 13, which is connected by a short bore 14 having a valve seat therein with the passage 15 leading into the outlet recess 16 in which is soldered or otherwise secured gas-tight the acetylene pipe 17, the other end of which is secured in the adjacent end of the block 18 which has an acetylene passage 19 leading from the pipe 17 to the acetylene pipe or tube 20 which connects the block 18 with the tip block 21. A valve stem 22 having its inner end co-operating with the valve seat in the bore 14 is threaded in the projection 23 from the block 10, and a gland nut 24 and suitable packing therein serves to make an air-tight valve by which the passage of the acetylene gas can be controlled. The connection 11 for high pressure oxygen opens into the chamber 25 formed in the valve block, and the short port 26 opens from the chamber 25 into the passage 27 which connects with the low pressure oxygen pipe 28 fitted into the block 10 like the pipe 17 and having its other end fitted into the block 18 which has the passage 29 therethrough which connects the pipe 28 with the pipe 30, the other end of which is secured in the head block 21. The valve bore 26 is closed and the low pressure oxygen regulated by the inner end of the valve stem 31, having the handle 32, and threaded into the projection 33 extending from the block 10 and provided with the gland nut 34 and suitable packing so as to make the valve gas-tight.

To control the high pressure oxygen, I provide the manual valve mechanism to be described: The adjacent cylindrical ends of the blocks 10 and 19 are connected by the cylindrical handle shell 35, which fits against the shoulder on the block 10, and is held in place by the ring 36 threaded on the larger end of the block 18. The slot 37 is provided in the handle sleeve 35, and passing through this slot is the vertical arm 38 of a finger piece having the button 39 threaded on its upper end. This finger piece has the arm 40 extending at right angles from the arm 38 and provided with the set-screw 41 threaded therethrough in position to engage the pipe 28 or tube 28 and limit the extent to which the button 39 can be depressed. A short link 42 is pivoted between the ears 43 projecting rearwardly from the block 18, and has its other end pivotally connected by the screw 44 with the arm 38 and also with the longer link 45, which is pivoted by the screw 46 between the ears 47 formed on the outer end of the block 48 into the other end of which is threaded the stem 49 of the high pressure oxygen valve 50. When the push button 39 has been depressed, the high pressure oxygen valve will be opened, as later described, and said valve can be held in its open position by swinging the push button and the supporting arm 39 to the dotted line position shown in Fig. 1, where the shoulder 51 co-operating with the edge of the slot 37 serves to hold the high pressure oxygen valve open without any further attention from the operator. It will be understood that the set screw 41 is adjusted so that the screw 44 does not pass the line connecting the pivot of the link 42 and the screw 46, so that by merely swinging the button 39 to release the shoulder 51 from the end of the slot 37, the spring 61 (to be hereinafter described) will serve to throw the button 39 out and close the valve without any outward pull on the button which would be necessary if the screw 44 did pass said line. The chamber 25 into which the high pressure oxygen enters has leading therefrom the passage 52 through which the valve stem 49 passes loosely, and which has the annular valve seat opening into the chamber 25, and adapted to be engaged by the packing 53 placed in the annular channel formed therefor in the valve head 50. The passage 52 is connected by the transverse passage 54 with the high pressure oxygen pipe 55 fitted into the valve block 10 in the same manner as the pipes 17 and 28, the other end of the pipe 55 being fitted in the block 18 which has the passage 56 therethrough connecting the pipe 55 with the high pressure oxygen pipe 57 fitted into the block 18 and likewise fitted at its other end into the head block 21. The enlarged outer end of the passage 52 has threaded into it the stuffing box 58, in which is placed the stuffing 59 surrounding the valve stem 49, and which is compressed by the sleeve 60 extending thereinto and provided with the annular flange against which presses one end of the helically coiled expanding spring 61, the other end of which engages the washer 62 surrounding the rod or stem 49 and engaging the end of the block or connection 48. With the construction shown, it will be seen that the spring 61 serves the double function of holding the valve seated and also compressing the stuffing 59.

Figure 1:
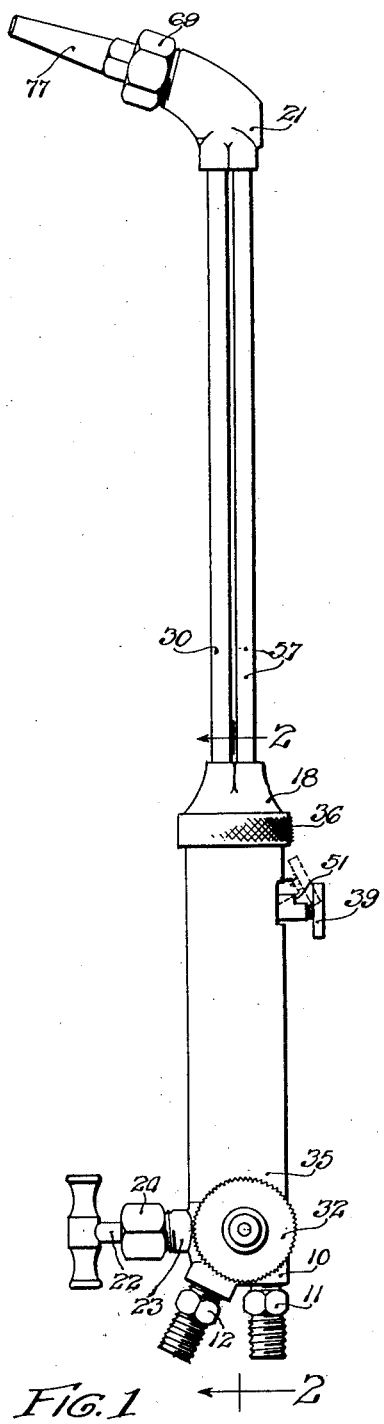
Fig. 1 is a side elevation of a torch embodying my invention.

The high pressure oxygen pipe 57 is connected by the bore 63 with the concave seat 64 corresponding roughly to a valve seat formed in the bottom of the cylindrical chamber 65 formed in the body of the head block 21. The low pressure oxygen pipe 30 is connected by the bore 66 with the bottom of the cylindrical chamber 65, and above this bottom the chamber 65 is interiorly threaded for some distance where it has the offset 67 by which it is enlarged, and this enlarged portion is connected by the passage 68 with the acetylene pipe 20. The lower end of the head block is externally threaded and has screwed thereon a gland nut 69 which engages the flat end of the compression ring 70, the bevelled inner end of which is forced between the inner edge of the head block and the cylindrical portion 71 of the tip. Where the torch is to be used for cutting, the tip 72 shown in Fig. 4 will be employed, and it will be noted that above its cylindrical portion 71 there is the threaded portion which is screwed into the threaded portion of the cylindrical recess 65 in the head block 21. This tip has the reduced end 73 which co-operates with the seat 65, and inasmuch as it is used for cutting so that the high pressure oxygen must pass through it, the central longitudinal bore 74 passing therethrough opens into the passage 63. Drilled eccentrically through the tip and surrounding the central bore 74 are the several bores 75 for the low pressure oxygen, the inner ends of these bores opening into the offset portion formed by the reduced portion 73. Bored from offset between the cylindrical portion 71 and the threaded portion are the radially extending bores 76, opening into the bores 75, so that below these bores 76, the bores 75 contain a mixture of the low pressure oxygen and acetylene to form the heating flame in the customary manner.

Where the torch is to be used for welding, as shown in Fig. 5, I substitute the tip 77 shown in Fig. 1, which has the projection 73$^a$ closed at its outer end so as to rest on the valve seat 64 and close the passage 63 so no high pressure oxygen can enter the tip. The central bore 74$^a$ is provided with the radial passages 77$^a$, and the passages 75 are omitted, and the passages 76$^a$ extend clear through to the central passage 74$^a$, which it will be noted is provided with the enlarged portion 78, which serves as an expansion chamber.

If occasion arises to remove the handle sleeve 35, it can be readily done by screwing off the collar 36 and the button 39, when it can be drawn off, the finger piece 38 being depressed and also swinging on the pivot screw 44 to permit its threaded end passing through the slot 37 as the sleeve 35 is drawn off. When it is to be replaced, after the parts are adjusted, the finger piece 38 is depressed and tilted into position to permit starting the sleeve on, which is then shoved on until the slot 37 reaches the finger piece 38, which will be thrust out through it by the action of the spring 61.

The operation of my improved cutting and welding torch will be readily understood from the foregoing description, and while I have shown and described my invention as embodied in the form which I at present consider best adapted to carry out its purposes it will be understood it is capable of modifications and that I do not desire to be limited in the interpretation of the following claims except as may be necessitated by the state of the prior art.

What I claim as new and desire to secure by Letters Patent of the United States is:

1. In a cutting and welding torch, the combination with a handle and three associated valve mechanisms, of a head block comprising an inlet end having three passages into a cylindrical recess which has a seat for the inlet end of a tip located at the center of its bottom with one of the aforesaid three passages opening into the center of said seat and with another of the aforesaid three passages opening into the side of the recess near its bottom, the enlarged outer end portion of said recess connected with the main body thereof by an offset and the third of the aforesaid three passages opening into the enlarged outer end portion, connections between the valves and the head block including three conduits communicating with the aforesaid three passages into the head block, a one-piece tip cooperating at its inner end with the aforesaid seat and having its end adjacent thereto reduced to form an annular chamber into which the second of the aforesaid three passages opens, and having an intermediate-sized portion filling and closing the recess between the second and third of the aforesaid three passages and having an enlarged portion where it emerges from the head block, and means for closing the outer end of the recess and forming a gas tight joint between it and the adjacent surface of the enlarged portion of the tip.

2. As an article of manufacture, a unitary single-piece tip having a central bore extending therethrough with its inner end adapted to cooperate with a seat, said inner end being reduced thereby forming an offset, an externally threaded portion below the reduced inner end, a plain cylindrical portion below the threaded portion, and a portion adapted to project beyond the block in which it is mounted, said tip having eccentric longitudinal bores extending from the offset formed at the reduced inner end to the other end, and a corresponding plurality of transverse bores from the end of the threaded portion to the eccentric bores.

3. In a torch, the combination with a head block having an inlet end with a plurality of passages thereinto, and an outlet end with a cylindrical recess internally threaded, into the inner end of which one of the aforesaid passages opens, and an enlargement of said recess at its outer end into which enlargement another of the aforesaid passages opens, of a single-piece tip having a threaded portion screwed into the block leaving open the passage opening into the bottom of the recess, and a cylindrical portion beyond the threaded portion, said tip having a longitudinal bore connected with the bottom of the recess and a transverse bore communicating with the longitudinal bore and enlarged portion of the recess, and means to close the outlet end of the head block and form a gas tight joint between it and the adjacent cylindrical portion of the tip, said means consisting of a compression sleeve having its inner end tapered and a nut threaded on the end of the head block and engaging the outer end of the compression sleeve.

4. In a torch, the combination with a head block having an inlet end with a plurality of passages thereinto and an outlet end with a cylindrical recess internally threaded, into the inner end of which one of the aforesaid passages opens, and an enlargement of said recess at its outer end, into which enlargement another of the aforesaid passages opens, of a tip having a threaded portion which can be screwed into the block leaving open the passage opening into the bottom of the recess, and a cylindrical portion beyond the threaded portion, said tip having a longitudinal bore connected with the bottom of the recess and a transverse bore communicating with the longitudinal bore and enlarged portion of the recess, and means to close the outlet end of the head block and form a gas-tight joint between it and the adjacent cylindrical portion of the tip.

5. In a device of the class described, the combination with a valve block having passages therethrough, of an end block having corresponding passages therethrough, tubes connecting the two sets of passages and holding said blocks in fixed relation, a slotted handle sleeve connecting the two blocks and enclosing the tubes, valves in the valve block controlling the passage therethrough, mechanism for opening one of said valves located in said sleeve, a threaded finger piece pivoted on said mechanism extending through the slot in the sleeve, a button screwed on the outer end of the finger piece, a shoulder on the valve block to receive the end of the handle sleeve, and a collar threaded on to the end block to hold the handle sleeve in place, the sleeve being removable by slipping it over the end of the block when the collar and button have been screwed off and removed from their respective supports and the finger piece is depressed through the slot inside of the handle sleeve.

In witness whereof, I have hereunto set my hand this 7th day of October, 1924.

ROBERT D. McINTOSH.